Nov. 3, 1970  J. A. BRAUN  3,537,903
PRESSURE RELEASING FEED-THROUGH BATTERY TERMINAL
Filed Dec. 19, 1968
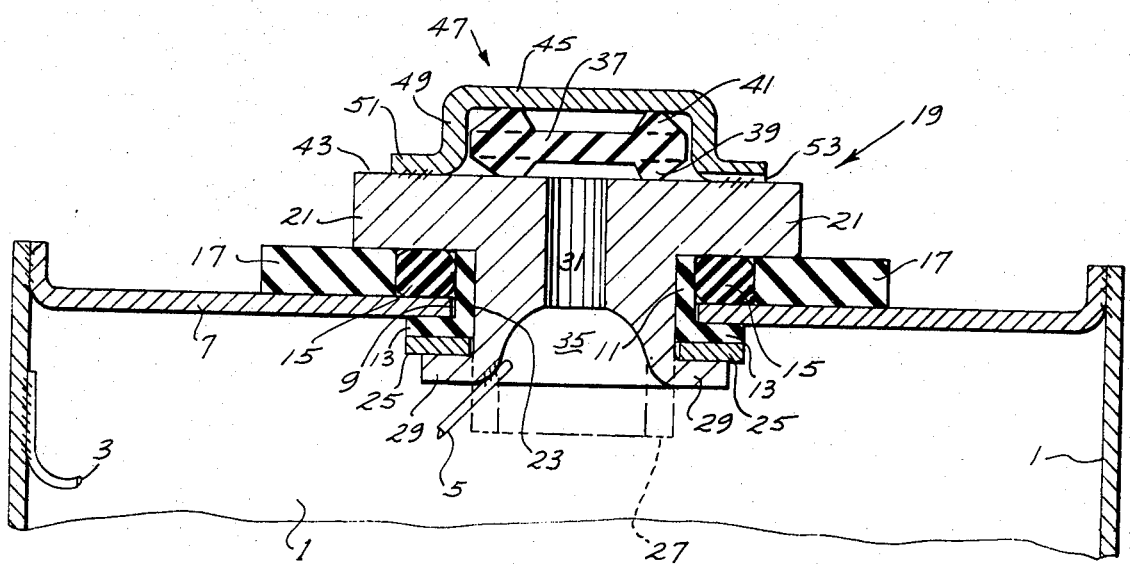
John A. Braun
Inventor.

United States Patent Office 3,537,903
Patented Nov. 3, 1970

3,537,903
PRESSURE RELEASING FEED-THROUGH
BATTERY TERMINAL
John A. Braun, Berkley, Mass., assignor to Texas Instruments Incorporated, Dallas, Tex., a corporation of Delaware
Filed Dec. 19, 1968, Ser. No. 785,189
Int. Cl. H01m 1/06, 31/00
U.S. Cl. 136—178
4 Claims

ABSTRACT OF THE DISCLOSURE

A hole through the conductive cover of a conductive battery casing has located therein an insulating sleeve. The sleeve extends outwardly from the cover and has an inside flange which engages the inside of the cover around the hole. An elastomeric O-ring is positioned on the outside of the cover around the extending sleeve. An insulating washer is located on the cover around the O-ring. An electrically conductive nipple has an outside flange and a radially crimped inside flange engaging a washer located under said inside flange of the insulating sleeve. On the outside flange of the nipple is welded a relief valve assembly.

---

Problems have arisen in the manufacture of batteries as regards making weldments after charging with electrolyte. Such welding has heated and driven off electrolyte and otherwise undesirably affected it. To prevent this and accommodate a relief valve generally leads to complicated, bulky and expensive arrangements which the invention avoids.

Referring to the drawing, it is a diagrammatic axial section through the upper portion of a battery incorporating the invention.

On the drawing, numeral 1 indicates a steel casing of a battery which contains the usual negative and positive electrodes (not shown). The negative-electrode conductive lead is shown at 3, being welded to the casing 1. The positive-electrode lead is numbered 5.

Welded or otherwise sealed to the casing 1 is the margin of an essentially flat steel cover 7 in which is a central hole 9. Extending through the hole 9 from its inside is an insulating Teflon sleeve 11 which has an inside flange 13 engaging the inside of the cover 7 around the hole 9. Parts 11 and 13 constitute a flanged nipple. Fitted around the sleeve 11 is an O-ring 15 and around this O-ring is located an insulating Teflon washer 17.

At numeral 19 is indicated a steel nipple in the form of a sleeve having an outer flange 21 and a cylindrical sleeve 23 extending through the inner nipple 11, 13. The original inner end shape of the cylindrical sleeve 23 before assembly is as shown by the dotted lines 27 in the drawing, but during assembly these dotted-line portions are flared outwardly by outward radial crimping to form a flange 29 which presses on a steel washer 25 provided under the flange 13. The positive-electrode lead 5 is welded to the crimped flange 29. A central opening 31 through the nipple 19 has an enlarged inner portion 35 to facilitate formation of the original shape 27 and crimping.

The O-ring 15 is composed of an elastomer resistant to attack by electrolyte carried in the casing 1. An appropriate material is ethylene propylene. Its free thickness is greater than the extension of sleeve 11 above cover 7 and greater than the thickness of washer 17. As a result, upon crimping of flange 21 on the end of sleeve 11 and on washer 17, the O-ring 15 is squeezed so as to form a seal.

At numeral 37 is shown an elastomeric disk of ethylene propylene, for example, which has opposed protruding annular seats 39 and 41. Seat 39 engages the flat top surface 43 of flange 21. The seat 41 engages the flat inside of a rigid flat top 45 of a cup 47 having cylindrical sides 49 which are flanged as shown at 51. A relief port 53 extends across the flange 51. The inside depth of cup 47 is less than the free distance between seats 39 and 41 so that, when the cup 47 is welded to surface 43 as illustrated, the seats 39 and 41 of disk 37 will be squeezed. Thus seat 39 will form a seal around opening 31 which however will release under excess internal pressure to bleed off through port 53. The margin of the disk 37 has a sliding fit with the inside of the cylindrical wall to center the disk.

Assembly is as follows:

Electrodes are placed in an open casing 1 and a negative lead 3 is welded to the casing. While the cover 7 is separated from the casing 1 the sleeve 11 is inserted from its inside into the opening 9. The O-ring 15 and the washer 17 are then applied to the other side of the cover 7. Then the cylindrical part 23 of the nipple 19 is telescoped from the outside into the sleeve 11, or the nipple 19 may be inserted into the opening 9 and the sleeve telescoped thereon from the inside. At this time the shape of its lower end is according to the dotted lines 27. Next the washer 25 is applied to the flange 13 after which the dotted shape 27 is crimped out under the washer 25 with reaction from the flange 21 so as to squeeze the O-ring 15 into sealing condition. Next, the cover 7 is brought near the open end of the casing 1 and the positive lead 5 is welded near the flange 29, there being enough slack in the lead to accomplish this. Then the margin of the cover 7 is welded or otherwise secured in sealed relation to the casing 1 which at this time contains no electrolyte. Also at this time the relief valve 47 is not in place, so that an appropriate nozzle may be inserted through the opening 31 and the battery filled with the appropriate electrolyte. Lastly, the disk 37 and its enclosing cup 45, 47, 49, 51 are applied. The flange 51 is then pressed and spot welded on the flange 21 which completes the battery. The cup 47 forms one terminal of the battery and the casing 1 its other terminal. Thus batteries may be stacked for series connections.

It will be seen from the above that the welding between the cover 7 and the casing 1 occurs before the battery contains any electrolyte. At the time that the member 47 is welded to the member 19 the battery contains electrolyte but this is not overheated because the extent of spot welding between the flanges 51 and 21 is short and the nipple 19, including its flange 21 and sleeve 23, is made sufficiently bulky so that it acts as a heat sink to prevent any damaging high temperature from reaching the electrolyte. Moreover the sealing assembly (11, 13, 15, 17) constitutes a bushing for the hole 9 and is not only electrically nonconductive but also of low heat conductivity so that the cover 7 is prevented from heating during welding. This restricts the path of heat conduction into the casing 1 to the small cross section of the sleeve 23. The compact construction minimizes the total linear inches of seal required and is inexpensive to make and assemble. Batteries of production runs are also uniform not only in structure but also as to volume of uncontaminated electrolyte.

In view of the above, it will be seen that the several objects of the invention are achieved and other advantageous results attained.

As various changes could be made in the above methods and products without departing from the scope of the invention, it is intended that all matter contained in the above description or shown in the accompanying drawing shall be interpreted as illustrative and not in a limiting sense.

What is claimed is:

1. A battery comprising a casing and a cover therefor, an insulating sleeve extending through a hole in the cover and forming an outside extension,
a flange on said insulating sleeve engaging the cover around the inside of the hole,
an inner washer under said flange of said insulating sleeve,
an elastomeric ring surrounding said extension and having a free thickness greater than the length of the extension,
an outer insulating washer surrounding the elastomeric ring and of a thickness less than the free thickness of the elastomeric ring,
a conductive sleeve extending inwardly through said insulating sleeve and providing a feed opening extending through the cover, said conductive sleeve having an exterior flange and an inner portion crimped under said washer, said exterior flange bearing upon said elastomeric ring to compress it and form a seal,
an elastomeric disk having a lower seat portion seating on the flange of the conductive sleeve and an upper seat portion,
and a cap having a flange welded to said flange of the conductive sleeve and engaging said upper seat portion to squeeze the margins of the disk, said cap having an opening therethrough.

2. A battery according to claim 1, wherein said exterior flange also bears upon said outer insulating washer and upon said outside extension of the insulating sleeve to limit compression of the elastomeric ring.

3. A battery according to claim 2, wherein said elastomeric ring is of the O-ring variety having a circular cross section of its ring form.

4. The method of assembling a battery from a weldable metal casing in which are electrical leads, a weldable metal cover therefor having a hole extending from its inside to its outside, an inwardly flanged insulating bushing for insertion into the hole from its inside, an exterior elastomeric sealing ring and a surrounding washer, an outwardly flanged nipple for telescoping with said bushing interiorly crimpable under the inside flange and a pressure relief assembly including a weldable cap, comprising:
connecting one lead to the casing before application of the cover thereto,
applying the seal and surrounding washer to the outside of the cover around the hole,
telescoping the nipple and bushing within the hole and the sealing ring,
crimping the inner end of the nipple under the bushing,
connecting the other lead to the nipple,
welding the cover to the casing,
inserting electrolyte into the container through the nipple, and
welding said cap to the nipple.

References Cited

UNITED STATES PATENTS

| | | | |
|---|---|---|---|
| 2,272,898 | 2/1942 | Olcott | 136—178 |
| 3,201,284 | 8/1965 | Ellis | 136—178 |

WINSTON A. DOUGLAS, Primary Examiner

A. SKAPARS, Assistant Examiner

U.S. Cl. X.R.

136—175